United States Patent
Pickens et al.

(10) Patent No.: US 8,275,898 B2
(45) Date of Patent: Sep. 25, 2012

(54) REPORTING STATUS OF REMOTE MEDIA INGEST

(75) Inventors: John Pickens, Newark, CA (US); Gil Cruz, Hampton, NJ (US)

(73) Assignee: Cisco Technology, Inc., San Jose, CA (US)

( * ) Notice: Subject to any disclaimer, the term of this patent is extended or adjusted under 35 U.S.C. 154(b) by 523 days.

(21) Appl. No.: 12/207,263

(22) Filed: Sep. 9, 2008

(65) Prior Publication Data

US 2010/0064052 A1 Mar. 11, 2010

(51) Int. Cl.
*G06F 15/16* (2006.01)
(52) U.S. Cl. .......... 709/231; 709/219; 725/94; 725/135; 370/465
(58) Field of Classification Search .................. 709/231, 709/223, 229
See application file for complete search history.

(56) References Cited

U.S. PATENT DOCUMENTS

| | | | |
|---|---|---|---|
| 2002/0147827 A1* | 10/2002 | Breiter et al. | 709/231 |
| 2002/0171494 A1* | 11/2002 | Debaty | 330/292 |
| 2002/0181494 A1* | 12/2002 | Rhee | 370/465 |
| 2003/0152093 A1* | 8/2003 | Gupta et al. | 370/412 |
| 2004/0078829 A1* | 4/2004 | Patel et al. | 725/135 |
| 2005/0083850 A1* | 4/2005 | Sin et al. | 370/252 |
| 2005/0246738 A1* | 11/2005 | Lockett et al. | 725/43 |
| 2006/0095472 A1* | 5/2006 | Krikorian et al. | 707/104.1 |
| 2006/0168631 A1* | 7/2006 | Nishikawa et al. | 725/89 |
| 2007/0022183 A1* | 1/2007 | Klemets | 709/219 |
| 2007/0130597 A1* | 6/2007 | Parker et al. | 725/94 |
| 2007/0149112 A1* | 6/2007 | Latour | 455/3.06 |
| 2008/0098323 A1* | 4/2008 | Vallone et al. | 715/772 |
| 2008/0134036 A1* | 6/2008 | Kapur et al. | 715/716 |
| 2008/0168495 A1* | 7/2008 | Roberts et al. | 725/39 |
| 2008/0256087 A1* | 10/2008 | Piironen et al. | 707/10 |

* cited by examiner

*Primary Examiner* — Brian P. Whipple
*Assistant Examiner* — Natisha Cox
(74) *Attorney, Agent, or Firm* — Merchant & Gould

(57) ABSTRACT

In one embodiment, an apparatus includes a content receiver, a concurrent streamer coupled to the content receiver, and a protocol engine coupled to the concurrent streamer. The content receiver receives an ingest stream of media content from a media source in response to a request for the media content from a local host. The concurrent streamer sends at least a portion of a local stream of the media content to the local host concurrent with the reception of the ingest stream of the media content by the content receiver. The protocol engine sends a protocol element from the network media server to the local host. The protocol element indicates an ingest status of the ingest stream at the content receiver.

20 Claims, 6 Drawing Sheets

REPORTING STATUS OF REMOTE MEDIA INGEST

TECHNICAL FIELD

The present disclosure relates generally to ingesting media at a network media server.

BACKGROUND

In a conventional video streaming system, a user may navigate video media at a local host while the content is being ingested at a remote network media server. The network media server ingests a segment of video content from a media source. While the network media server ingests the segment of video content, the local host concurrently downloads the video content, or a copy thereof, from the remote network media server. In many cases, there is a latency delay, or time offset, between the time that a segment of the video content is ingested by the network media server and the time that same segment is downloaded by the local host from the network media server. For example, if a user pauses the playback of video content, the remote network media server continues to ingest video content, and the local host resumes downloading the video content from the remote network media server when playback resumes.

When a user initiates playback prior to the completion of ingest by the network media server, the local host locally generates a status bar to display the download status of the media downloaded to the local host. For example, the download status shows the percentage of content downloaded from the remote network media server to the local host, and the user can navigate forward only to that portion that is currently downloaded at the local host. In the conventional system, the dynamically updated download status reflects the percentage of content received by the local host. Downloading the download stream at the local host without knowledge of the ingest of the ingest stream by the network media server may cause problems in the playback and/or confusion to the user at the local host.

Overview

Embodiments of an apparatus are described. In one embodiment, the apparatus is an apparatus for reporting media stream status. In one embodiment, the apparatus includes a content receiver, a concurrent streamer coupled to the content receiver, and a protocol engine coupled to the concurrent streamer. The content receiver receives an ingest stream of media content from a media source in response to a request for the media content from a local host. The concurrent streamer sends at least a portion of a local stream of the media content to the local host concurrent with the reception of the ingest stream of the media content by the content receiver. The protocol engine sends a protocol element from the network media server to the local host. The protocol element indicates an ingest status of the ingest stream at the content receiver. Other embodiments of the apparatus are also described.

Embodiments of a method are also described. In one embodiment, the method includes receiving from a network media server to a local host at least a portion of a local stream of media content concurrent with a reception of an ingest stream of the media content by the network media server in response to a request for the media content from the local host. The method also includes receiving an ingest status from the network media server to the local host. The ingest status indicates an ingest progress of the ingest stream at the network media server. Other embodiments of the method are also described.

Other embodiments will become apparent from the following detailed description, taken in conjunction with the accompanying drawings, illustrated by way of example.

BRIEF DESCRIPTION OF THE DRAWINGS

Throughout the description, similar reference numbers may be used to identify similar elements.

DESCRIPTION OF EXAMPLE EMBODIMENTS

Figure 1:
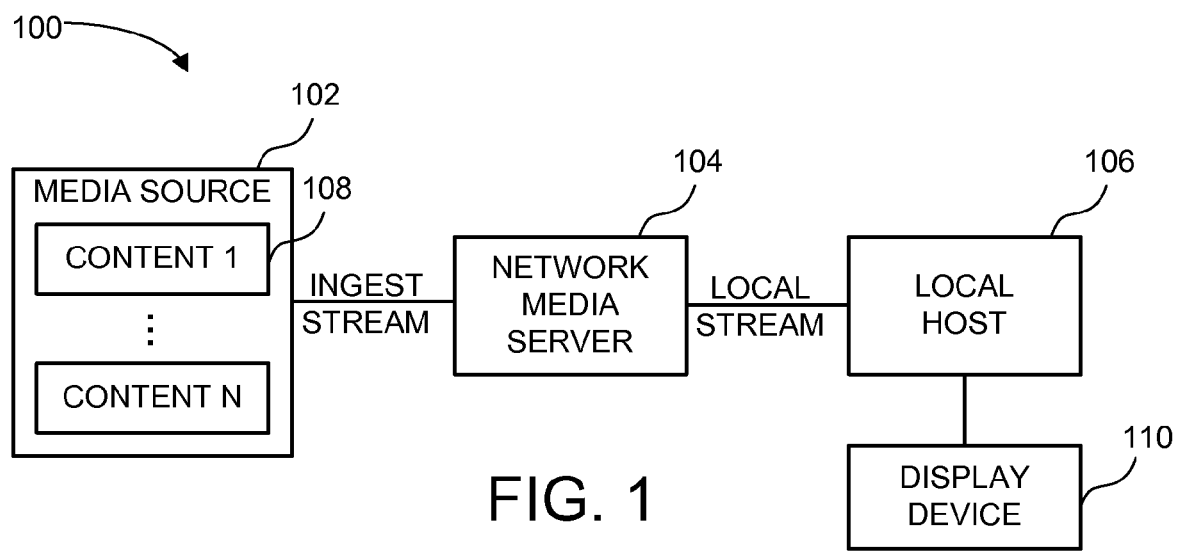
FIG. 1 depicts a schematic diagram of one embodiment of a network media system.

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments facilitate reporting the ingest status of an ingest stream of media content at a network media server. Displaying the ingest status on the local host allows a user on the local host to be aware that the media content is not entirely ingested at the network media server. Additionally, the local host may display the ingest status in relation to the download status of the local stream at the local host. Allowing the user to know the current ingest status of the media content at the network media server in relation to the download status of the local stream at the local host allows the user to know how far forward he or she can navigate the media content on the local host without potentially causing the appearance of an error in the local stream. Additionally, the local host may display the ingest status relative to the current playback position to facilitate navigation.

In some embodiments, the ingest status may be displayed only at certain times during playback. As one example, normal playback may occur without displaying the ingest status and, in some embodiments, the ingest status is displayed only when the playback is within a specified threshold of the current ingest point. In other words, the ingest status is displayed when the playback or other navigation (e.g., fast-forward) gets to a certain point relative to the ingest-end, at which point, the ingest status may be displayed in a popup window to notify the user that the navigation point is relatively close to the ingest point.

In some embodiments, a distribution protocol between the local host and the network media server allows the playback of the local stream to transition smoothly between 1× play mode and, for example, fast-forward, up to the present ingest point of the ingest stream without potentially causing the appearance of an error such as an unexpected termination in the local stream. For example, the distribution protocol may notify a client when the navigation point is at the end of the ingest stream and, at that point, transition from a fast forward mode to the 1× play mode.

Embodiments of the invention enable accurate reporting of the portion of content that is navigable between a network media server and the local host. Both periodic percentage and infrequent rate based parameters may be communicated between the network media server and the local host. In some embodiments, a local host user interface provides a status bar that indicates visual feedback to the user. In some embodiments, the status bar includes a horizontal bar at the bottom of the displayed playback, a vertical bar at the side of the displayed playback, or some other similar type of status indication. Alternatively, in some embodiments, no indication is provided to the user unless the appearance of an error in the local stream is pending, or anticipated. The distribution protocol between the local host and the network media server is capable of low latency dynamic transitions between variants of the stream in 1× mode and fast forward or fast rewind modes, delivering a similar experience to that of a digital video recorder (DVR) that implements local storage of media content.

Embodiments of the invention also enable concurrent network based ingest and concurrent streaming (1× mode or trick mode of the stream). A network media server within the network ingests content from external sources (e.g., library servers within an internal nationwide content distribution network and external networks such as Disney or CNN). The content can be video on demand (VOD) or delayed access to live content ingested by network media servers. As the network media server ingests the content, the same content, or a copy thereof, is concurrently streamed to the subscriber local host. In comparison, conventional playback solutions wait until the content is fully ingested at the remote network media server before playing it out at the local host to avoid confusion to the subscriber. A display on the local host displays an ingest status based on the ingest at the network media server shortly after commencement of ingest within the network media server. The ingest rate may be the same as or different from the download stream rate. The ingest rate also may vary as a function of network load as well as the server load of the external source server (media source 102) and/or the network media server 104.

FIG. 1 depicts a schematic diagram of one embodiment of a network media system 100. The network media system 100 includes a media source 102, a network media server 104, and a local host 106. As depicted, the media source 102 includes a content element 108. Additionally, the local host 106 includes a display device 110. Furthermore, as depicted in FIG. 1, an ingest stream streams between the media source 102 and the network media server 104, and a local stream streams between the network media server 104 and the local host 106. It should be noted that the configurations of the media source 102, the network media server 104, and the local host 106 are not limited to particular hardware or software implementations.

Although the depicted network media system 100 is shown and described herein with certain components and functionality, other embodiments of the network media system 100 may be implemented with fewer or more components or with more or less functionality. For example, some embodiments of the network media system 100 include a plurality of media sources 102, a plurality of network media servers 104, and/or a plurality of local hosts 106. Additionally, some embodiments of the network media system 100 include similar components arranged in another manner to provide similar functionality, in one or more aspects.

Additionally, where two or more local hosts such as the local host 106 are present within the network media system 100, in one embodiment, the network media server 104 may facilitate a single stream among the local hosts. Alternatively, in some embodiments, multiple local hosts may be present within the network media system 100. Additionally, the network media server 104 may facilitate a unique content stream to each of multiple local hosts.

In one embodiment, the media source 102 includes a content element 108 that a user on the local host 106 may view on the display device 110. In some embodiments, the ingest stream supplied by the media source 102 includes a live broadcast. The acquisition of the live broadcast may start after the live broadcast. In this case, the ingest operation is behind the amount of content that is actually available, so it is in a "catch up to live ingest" case. Additionally, the ingest stream supplied by the media source 102 may include a pre-recorded broadcast. Moreover, in some embodiments, the media source 102 includes a video-on-demand (VOD) service that supplies downloadable and/or streaming video content. Additionally, in some embodiments, the media source 102 includes a digital video service provider such as an internet protocol television (IPTV) service or a switched digital video (SDV) service that supplies video content to the network media server 104. While the network media server 104 acquires the content from the media source 102, in some embodiments, the network media server 104 sends the ingest stream over a quadrature amplitude modulation (QAM) channel to the local host 106 such as a QAM channel over a coaxial cable.

In one embodiment, the network media server 104 serves the request for at least one portion of the selected content element 108 of the user on the local host 106 to the media source 102. In other words, the network media server 104 sends or makes the request. The network media server 104 receives the ingest stream in response to the request by the user for at least one portion of the selected content element 108. The network media server 104 sends a local stream to the local host 106 concurrent with receipt of the ingest stream from the media source 102. Hence, the status of the local stream corresponds to the status of the ingest stream as the ingest stream corresponds to the request of the selected content element 108 by the user. As explained above, a latency delay may exist between the ingest of the at least one portion of the selected content element 108 and the downloading of the selected content element 108 by the local host 106. Some embodiments of the network media server 104 exist within the premises of the user and may include local media servers such as a cable box, a cable modem, an access point, an internet protocol (IP) router, a satellite dish and receiver, and so forth. Alternatively the network media server 104 exists beyond the premises of the user and may include network hosted media servers such as centralized media hubs, network digital video recorders (nDVRs), a centralized network head-end, a media satellite, and so forth.

In one embodiment, the local host 106 receives a local stream that corresponds to a request by a user for at least one portion of the selected content element 108 stored on the media source 102. The local host 106 includes a display device 110 to allow the user to view the content element 108 as well as the user's request of at least a portion of the selected content element 108 from the media source 102. The display device 110, in some embodiments, displays the content element 108 available on the media source 102 to enable a user to request a download stream of at least one portion of the selected content element 108 on the media source 102. Additionally, the display device 110 is configured to display a local stream download status based on the download status of the local stream at the local host 106. It should be noted that the display of the local stream download status is not constrained as to when the display device 110 is visible. The local host 106 may be a set-top box (STB), a personal computer (PC), a cell phone, a mobile media device, and so forth. Although the media source 102 is depicted as connected to the network media server 104, in some embodiments, the media source 102 is connected directly to the local host 106. Thus, in some embodiments, the network media server 104 is integrated into the local host 106 and the media source 102 sends and/or streams the data stream directly to the local host 106 through the network media server integrated in the local host 106.

Figure 2:
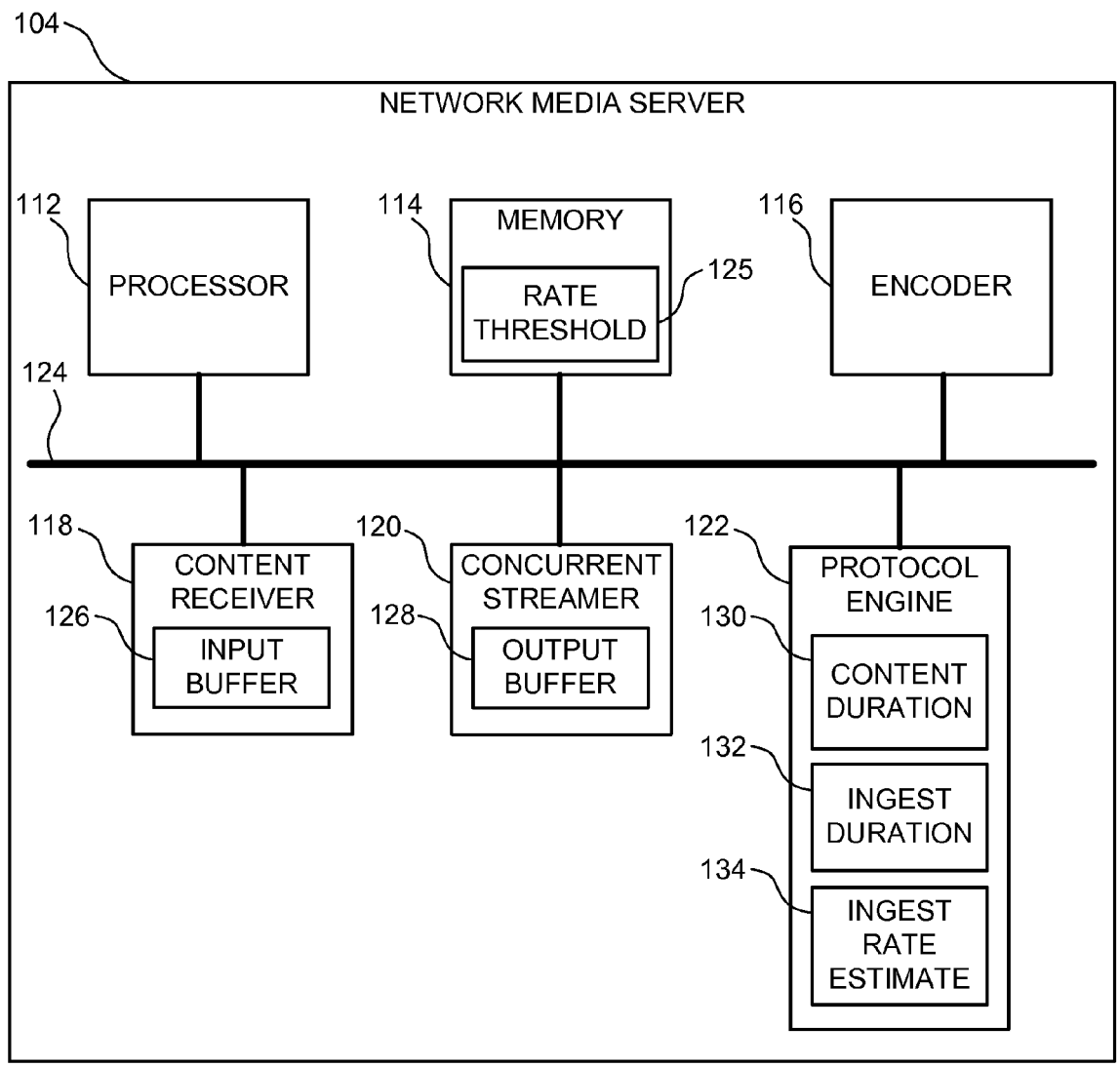
FIG. 2 depicts a schematic diagram of one embodiment of the network media server of FIG. 1.

FIG. 2 depicts a schematic diagram of one embodiment of the network media server 104 of FIG. 1. The illustrated network media server 104 includes a memory device 114, a processor 112, and an encoder 116. Additionally, some embodiments of the network media server 104 include a content receiver 118, a concurrent streamer 120, a protocol engine 122, and at least one bus interface 124. Additionally, some embodiments of the memory device 114 include a predetermined rate threshold 125. Additionally, some embodiments of the content receiver 118 include an input buffer 126. Additionally, some embodiments of the concurrent streamer 120 include an output buffer 128. Furthermore, some embodiments of the protocol engine 122 include a content duration 130, an ingest duration 132, and an ingest rate estimate 134. It should be noted that the configurations of the processor 112, the memory device 114, the encoder 116, the content receiver 118, the concurrent streamer 120, and the protocol engine 122 are not limited to particular hardware or software implementations.

Although the depicted network media server 104 is shown and described herein with certain components and functionality, other embodiments of the network media server 104 may be implemented with fewer or more components or with more or less functionality. For example, in some embodiments, at least some of the components of the network media server 104 may be integrated, at least partially, on an integrated circuit.

In one embodiment, the illustrated processor 112 executes a command stored in the memory device 114. Alternatively, the processor 112 executes a command received from the local host 106 and/or the media source 102. In some embodiments, the processor 112 is a central processing unit (CPU) with one or more processing cores. In other embodiments, the processor 112 is a network processing unit (NPU) or another type of processing device such as a general purpose processor, an application specific processor, a multi-core processor, or a microprocessor. In general, the processor 112 executes one or more instructions to provide operational functionality to the network media server 104. The instructions may be stored locally in the processor 112 or in the memory device 114. Alternatively, the instructions may be distributed across one or more devices such as the processor 112, the memory device 114, or another data storage device.

As depicted, the memory device 114 stores a rate threshold 125. The rate threshold 125 is predetermined to indicate whether the protocol engine 122 should send the latest ingest rate estimate 134 to the local host 106. In one embodiment, the memory device 114 is a random access memory (RAM) or another type of dynamic storage device. In other embodiments, the memory device 114 is a read-only memory (ROM) or another type of static storage device. In other embodiments, the illustrated memory device 114 is representative of both RAM and static storage memory within the network media server 104. Additionally, some embodiments store the instructions related to the operation of the network media server 104 as firmware such as embedded foundation code, basic input/output system (BIOS) code, cluster optimization code, and/or other similar code.

In one embodiment, the encoder 116 encodes video content on the network media server 104. In other words, the network media server 104 may implement a transcoding function via the encoder 116. Hence, the network media server 104 may perform several types of processing of the content from the media source 102. Transcoding may merely introduce one potential source of delay in the overall ingest/readiness process. It should be noted that the transcoding delay may be based on factors such as transcoding farm load, specific transcoding permutation, and so forth. In some embodiments, the encoder 116 encodes a content element 108 from the media source 102. Additionally, in some embodiments, the encoder 116 encodes a local stream from the ingest stream. For example, the encoder 116 may receive the ingest stream from the media source 102 and encode the local stream at a different encoding rate (i.e., megabits per second) and resolution (i.e., 1920 pixels by 1080 pixels) from the original encoding rate and resolution of the ingest stream. In other words, the display device 110 of the local host 106 may include a cell phone screen. The resolution of a typical cell phone screen is lower than the resolution of a home television screen or a PC screen. Hence, the encoder 116, in some embodiments, re-encodes the ingest stream to generate the local stream in order to adapt the ingest stream to certain specifications and capabilities of the display device 110 of the local host 106. In some embodiments, the network media server 104 in conjunction with the encoder 116 implements block-based motion estimation based codecs such as the Moving Picture Experts Group (MPEG) standards including MPEG-2 and MPEG-4 in association with the encoding of the local stream.

In one embodiment, the content receiver 118 is configured to receive an ingest stream of a selected content element 108 from the media source 102 in response to a request for the selected content element 108 from the local host 106. It should be noted that there is no constraint as to the signaling path and to the existence of zero or more intervening servers between the local host 106 and the content receiver 118. As illustrated, the content receiver 118 includes an input buffer 126. In some embodiments the input buffer 126 buffers the incoming ingest stream from the media source 102. Additionally, the input buffer 126 sends the ingest stream to the output buffer 128 of the concurrent streamer 120. In some embodiments, the input buffer 126 sends a copy of the ingest stream to the output buffer 128.

In one embodiment, the concurrent streamer 120 is configured to send at least a portion of the local stream of the selected content element 108 to the local host 106 concurrent with the reception of the ingest stream of the selected content element 108 by the content receiver 118. In some embodiments, the output buffer 128 buffers the local stream that the network media server 104 sends to the local host 106.

The protocol engine 122, in one embodiment, is configured to send a protocol element from the network media server 104 to the local host 106. The protocol element indicates an ingest status of the ingest stream at the content receiver 118. The protocol engine 122 includes a content duration 130 and an ingest duration 132. The content duration 130 indicates the total time duration of the selected content element 108. In some embodiments, the protocol engine 122 is further configured to send the content duration 130 from the network media server 104 to the local host 106. The ingest duration 132 is configured to indicate a time duration of the ingested stream of the media content by the network media server 104. In other words, the ingest duration 132 may indicate a percentage of the amount of the media content that the network media server 104 has currently downloaded.

In an example embodiment, the content duration 130 of the media content may be a total length of one hour. It should be noted that the duration of ingest content may be learned from an ingest control interface such as the VOD case (a fixed length in metadata) and the network personal video recorder (nPVR) case (such as ingest that is learned from an electronic program guide, or equivalent data structure). At a certain time during the ingest of the media content by the network media server 104, the current ingest duration 132 may be 15 minutes. In other words, the network media server 104, at the certain time, has ingested 15 minutes of the total length of the media content, or 25% of the total duration of one hour indicated in the content duration 130. The protocol engine 122 is further configured to send the ingest duration 132 to the local host 106 in conjunction with the content duration 130 to enable the local host 106 to display the actual amount of ingest at the network media server 104 relative to the content duration 130. Thus, the protocol engine 122 may send the ingest duration 132 to the local host 106 in units of time such as 15 minutes to indicate the amount of the media content currently downloaded by the network media server. Alternatively, the protocol engine 122, in some embodiments, sends the ingest duration 132 as a percentage of completion such as 25% complete at the certain time. Furthermore, in some embodiments, the protocol engine 122 may send the ingest duration 132 in units of time or as a percentage to indicate the amount of the media content currently remaining to be downloaded such as 45 minutes remaining or 75% remaining, respectively.

Additionally, the protocol engine 122 includes an ingest rate estimate 134. The ingest rate estimate 134 is configured to indicate an average ingest rate of the ingest stream. Additionally, in some embodiments, the ingest rate estimate 134 is configured to indicate an exponentially weighted moving average ingest rate. For example, if the ingest rate is 2× for 20 minutes and then changes to 1×, the ingest rate estimate 134 may indicate a current projected rate based on the size of the currently ingested content. Other embodiments may use other types of estimates. The protocol engine 122 is further configured to periodically determine the average ingest rate of the ingest stream of the media content and to send the ingest rate estimate 134 to the local host 106 to enable the local host 106 to estimate a current stream rate of the local stream based on the average ingest rate of the ingest stream. The current stream rate is the rate at which the local stream is streaming. The protocol engine 122 is further configured to determine whether a difference between the average ingest rate and a previous average ingest rate, or a previously notified projected ingest rate, exceeds the predetermined rate threshold 125. The protocol engine is further configured to send the ingest rate estimate to the local host in response to the determination that the difference exceeds the predetermined rate threshold 125. In other words, the ingest rate estimate 134 predicts the rate at which the selected media content will continue to arrive at the local host 106. Using the average ingest rate information the local host 106 dynamically advances the status bar accordingly. In some embodiments, the network media server 106 only resends the message if the rate changes beyond the predetermined rate threshold 125. Additionally, in some embodiments, the network media server 106 resends the message if the future projected end time is off by a percentage based on what is originally signaled.

In some embodiments, the components of the protocol engine 122, including the content duration 130, the ingest duration 132, and the ingest rate estimate 134, are part of a protocol element of the local stream. In other words, the local stream may include a protocol element field to indicate the current status of the download of the ingest stream at the network media server 104. In some embodiments, the protocol element includes three separate fields, one field each for the content duration 130, the ingest duration 132, and the ingest rate estimate 134. In some embodiments, the protocol engine 122 is further configured to send the protocol element to the local host 106 with the local stream. In some embodiments, the protocol engine 122 is further configured to embed the protocol element in the local stream and to send the local stream to the local host 106 via the real-time transport protocol (RTP). Additionally, the protocol engine 122 may send the protocol element from the network media server to the local host via a real-time streaming protocol (RTSP) command. In some embodiments, the protocol engine 122 is further configured to send the protocol element from the network media server 104 to the local host 106 via a message separate from the local stream. In this case, the protocol element may be transported within RTSP or another similar streaming control protocol. The protocol element contains one or more commands sent by the network media server 104 such as the Announce or the Play_Notify command. Other embodiments may use other protocol commands to transport the protocol element.

The bus interface 124 is configured to facilitate communications related to the operations and functions of the network media server 104, including processing streaming commands, as well as storing, sending, and receiving data packets associated with the operations and functions of the network media server 104.

Figure 3A:
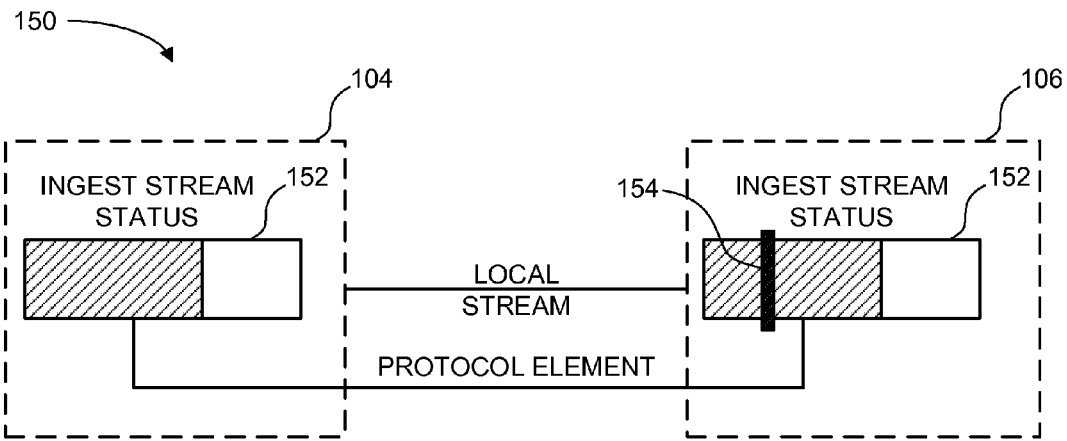
FIG. 3A depicts a schematic block diagram of an example embodiment of a process to locally generate an ingest status of an ingest stream.

FIG. 3A depicts a schematic block diagram of an example embodiment of a process 150 to locally generate an ingest status 152 of an ingest stream relative to a download status 154 of the local stream at the local host 106. As depicted, the network media server 104 sends the protocol element to the local host 106. In some embodiments, the display device 110 of the local host 106 then displays the ingest status 152 locally at the local host 106 based on the ingest status 152 at the network media server 104. In some embodiments, the display device 110 displays the ingest status 152 locally at the local host 106 in relation to the download status 154 of the local stream. Alternatively, the display device 110, in some embodiments, displays the ingest status 152 locally at the local host 106 in place of the download status of the local stream. Display of the ingest stream status 152 in relation to the download status 154 allows a viewer to know the current ingest status of the media content at the network media server in relation to the download status of the local stream at the local host and allows the user to know how far forward he or she can navigate the media content on the local host without potentially causing the appearance of an error in the local stream. It should be noted that in this case trick modes generated from the network may or may not be enabled.

Additionally, in some embodiments, the ingest status 152 includes a streaming status of the selected content element 108. In other words, the ingest status 152 that the display device 110 displays is a status of streaming content from the media source 102 to the network media server 104 displayed on the local host 106. In this way, as a user selects to view certain media, for example, on a cable television system (local host 106), the user's television does not display the streaming download status of the selected media by the user's cable modem, but instead, the user's television displays the status of the ingest of the selected media (content element 108) at the network media server 104.

As another example, a user may view media (content elements 108) from the media server 102 on a mobile computing device (local host 106). The user may select one or more parts of media from the media source 102 by connecting to the media source 102 through a data tower (network media server 104). The data tower then begins to ingest the selected media and concurrently begins to stream the same selected content to the user's mobile computing device. The user is then kept apprised of the current state of the streaming download when the display device 110 of the user's mobile computing device displays the ingest stream rate of the media at the data tower relative to the download status of the local stream at the user's mobile computing device.

Figure 3B:
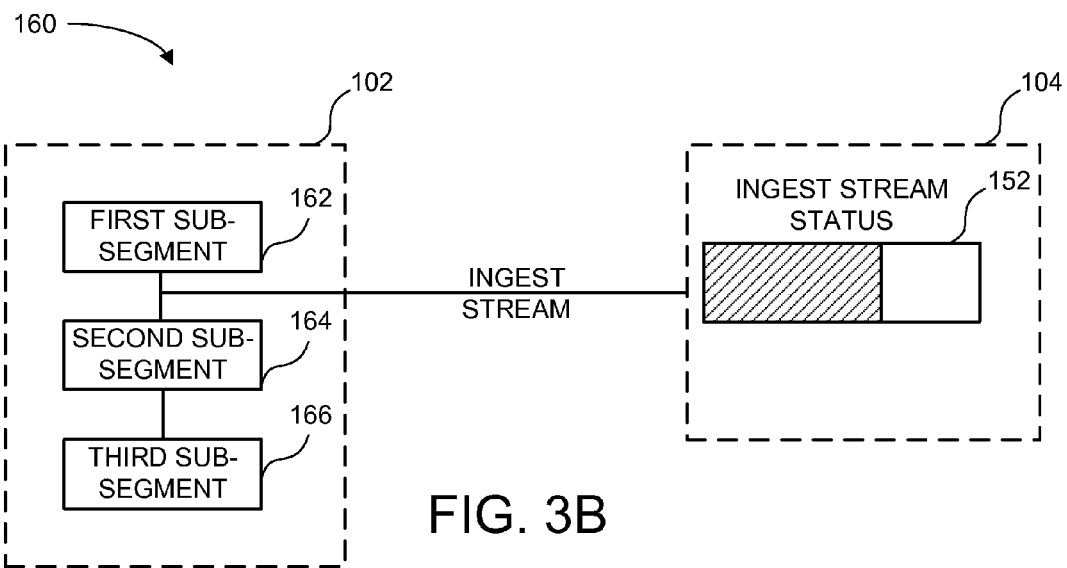
FIG. 3B depicts a schematic block diagram of an example embodiment of a process to generate an ingest status of an ingest stream of sub-segments of selected media content.

FIG. 3B depicts a schematic block diagram of an example embodiment of a process 160 to generate an ingest status 152 of an ingest stream of sub-segments of selected media content. As depicted, the sub-segments of the selected media content include at least a first sub-segment 162, a second sub-segment 164, and a third sub-segment 166 of the selected content element 108. In other words, as illustrated in FIG. 3B, the selected media content is not a single serialized media stream, but is composed of two or more sub-segments of media streams such as the first sub-segment 162, the second sub-segment 164, and the third sub-segment 166. In an example embodiment, a user on the local host 106 makes a request for "all game winning Super-Bowl touchdowns." In some embodiments, the ingest status messaging (i.e., the protocol element) includes at least one field to identify the virtualized substructure of the sub-segment media content as well as the ingest status for each of the sub-structural elements such as the first sub-segment 162, the second sub-segment 164, and the third sub-segment 164.

Figure 3C:
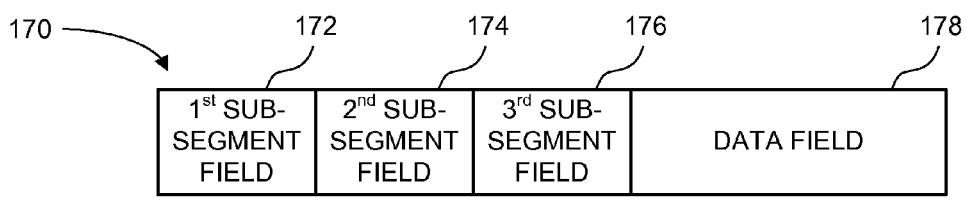
FIG. 3C depicts a schematic block diagram of an example embodiment of the ingest stream based on the request of the sub-segments of the selected media content by a user on the local host.

FIG. 3C depicts a schematic block diagram of an example embodiment of the ingest stream 170 based on the request of the sub-segments of the selected media content by a user on the local host 106. As depicted, the ingest stream 170 includes a first sub-segment field 172, a second sub-segment field 174, a third sub-segment field 176, and a data field 178. The three sub-segment data fields 172, 174, and 176 correspond to the three requested sub-segments 162, 164, and 166, respectively, of FIG. 3B. It should be noted, although FIGS. 3B and 3C depict three sub-segments and three corresponding sub-segment fields for each of the requested sub-segments of the selected content element 108, respectively, some embodiments of the requested sub-segments and/or the ingest stream 170 include less or more sub-segments and/or sub-segment fields.

As depicted, the ingest stream from the media source 102 to the media network server 104 includes data fields for each of the sub-segments associated with the request for media content by the user on the local host 106. Each of the sub-segment data fields 172, 174, and 176, in some embodiments, include the content duration 130, the ingest duration 132, and/or the ingest rate estimate 134 for each of the sub-segments 162, 164, and 166 so that the ingest status of the ingest stream can be displayed on the display device 110 of the local host 106. Alternatively, in some embodiments, the media source 102 sends an individual ingest stream for each of the sub-segments 162, 164, and 166. Hence, in some embodiments, the network media server 104 receives the sub-segments 162, 164, and 166 individually in several ingest streams (three ingest streams in the example embodiment) or collectively in a single ingest stream. The network media server 104 then combines the sub-segments 162, 164 and 166 into a single local stream and sends the single local stream to the local host 106. Alternatively, in some embodiments, the network media server 104 forwards the sub-segments 162, 164, and 166, or copies thereof, to the local host 106, and the local host 106 combines the sub-segments 162, 164, and 166 into a single segment of media content for display on the display device 110.

Figure 4:
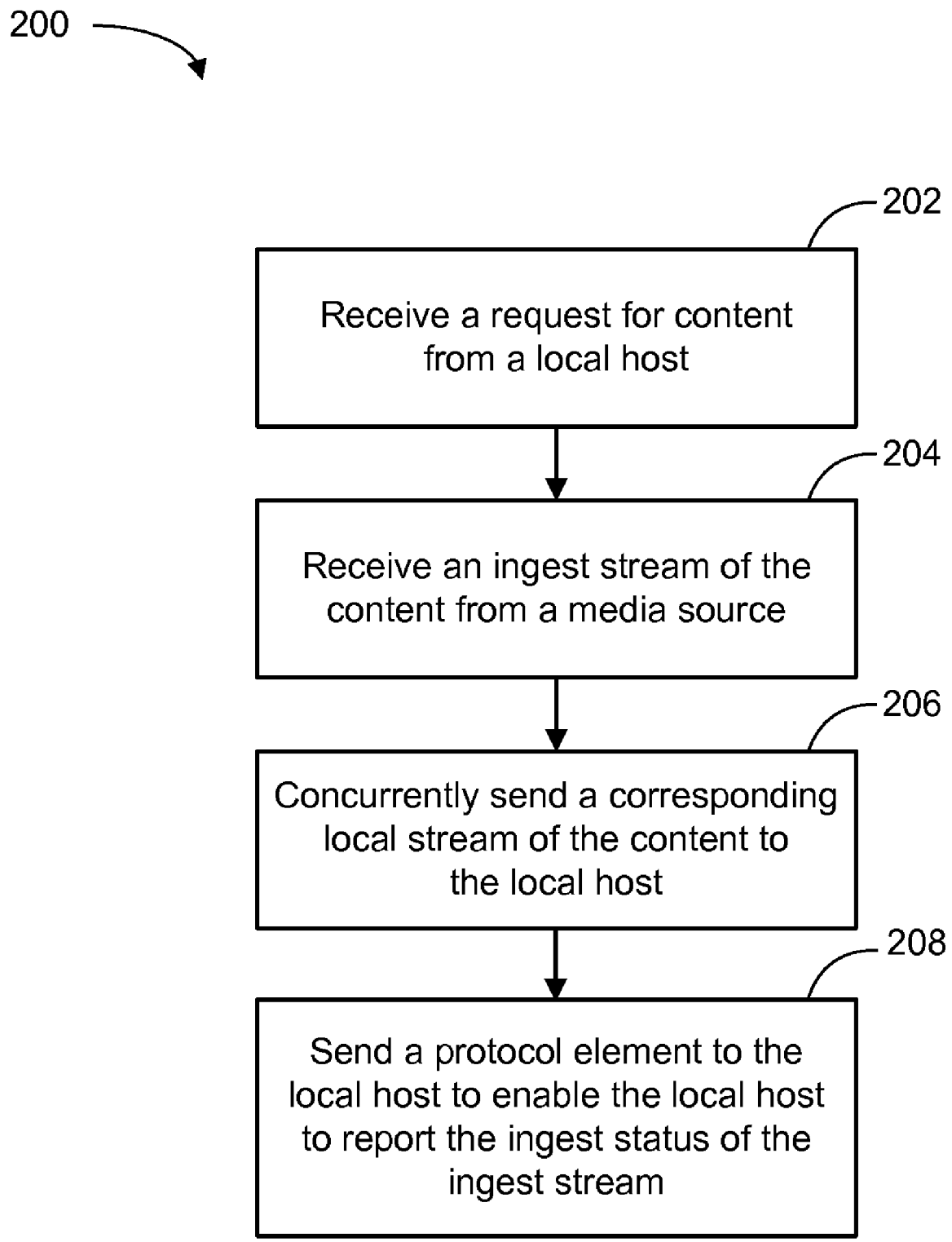
FIG. 4 depicts a flow chart diagram showing one embodiment of a method for reporting an ingest status of an ingest stream at the local host of FIG. 1.

FIG. 4 depicts a flow chart diagram showing one embodiment of a method 200 for reporting an ingest status of an ingest stream at the local host of FIG. 1. Although the method 200 is described in conjunction with the network media system 100 of FIG. 1 and components thereof, other embodiments of the method 200 may be implemented with other network media systems and/or other components thereof.

As illustrated, at block 202, the media source 102 receives a request for a selected content element 108 from the local host 106. More specifically, in some embodiments, the network media server 104 serves the request from the local host to the media source 102. At block 204, the network media server 104 receives an ingest stream of the requested content from the media source 102. At block 206, the network media server 104 concurrently sends a corresponding local stream of the requested content to the local host 106. More specifically, the content receiver 118 receives the ingest stream while the input buffer 126 buffers the ingest stream from the media source 102, and the concurrent streamer 120 concurrently sends the corresponding local stream of the requested content to the local host 106 while the output buffer 128 buffers the local stream to the local host 106. At block 208, the protocol engine 122 sends a protocol element to the local host 106 to enable the local host 106 to report the ingest status of the ingest stream. As described above, the protocol element may include at least the content duration 130, the ingest duration 132, and/or the ingest rate estimate 134.

It should be noted that the stream that is sent is not necessarily the same stream that is ingested. In one implementation, at ingest time "n" correlated versions of the stream are generated, with n/2 forward trick streams and n/2 rewind trick streams. Based on commands received from the local host, either the 1×, or any trick mode version of the ingest stream is sent. Alternatively, in some embodiments, the trick streams are generated dynamically based on 1× content contained within the network media server. Hence, what is being sent to the local host is relative to the original stream. In some embodiments, the local host 106 stores the entire received stream. Alternatively, in some embodiments, the local host 106 stores a received window in a local storage and is configured to discard a segment of the content that has been displayed on the display device 110.

Figure 5:
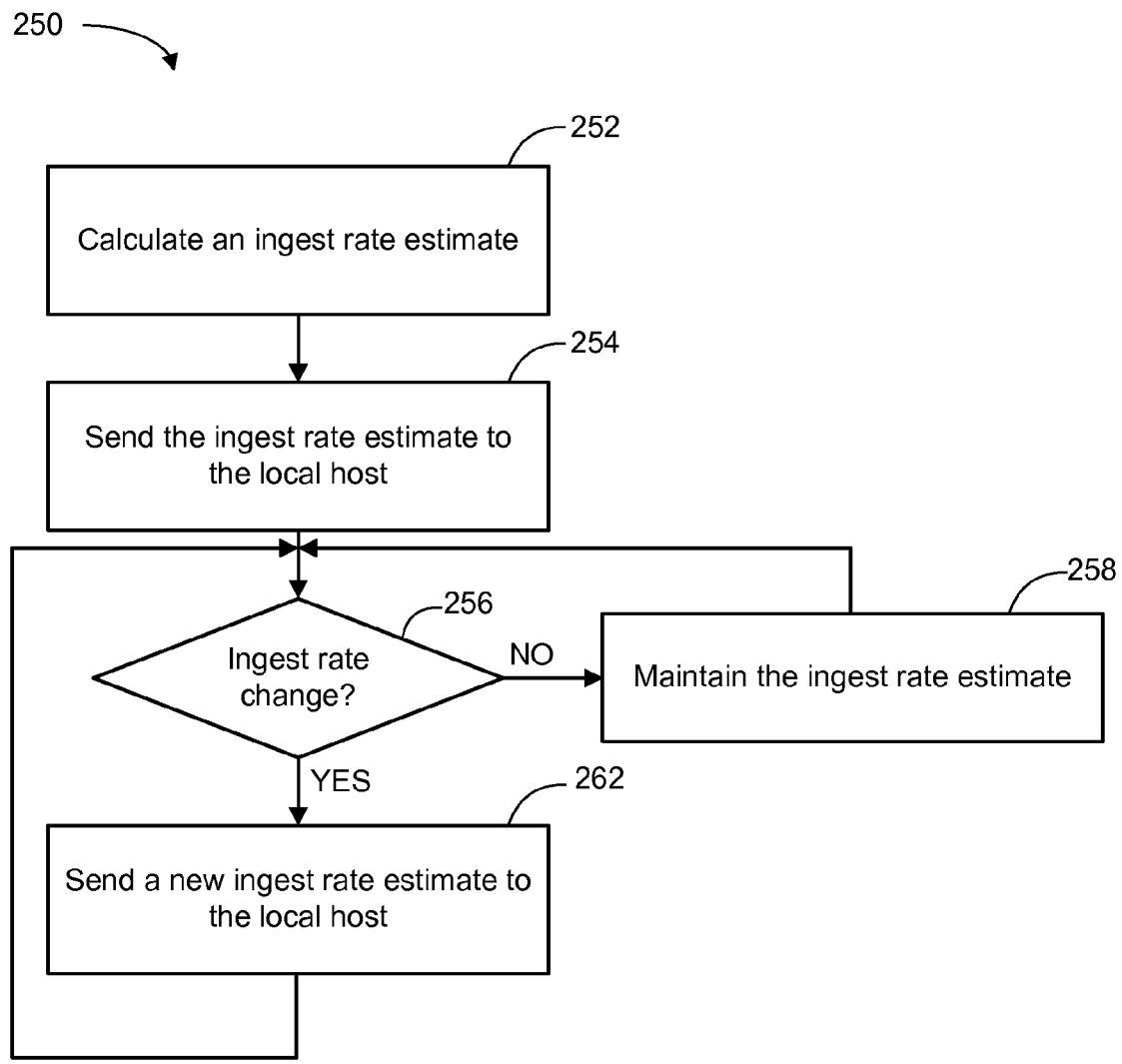
FIG. 5 depicts a flow chart diagram showing one embodiment of a method for updating an ingest rate estimate.

FIG. 5 depicts a flow chart diagram showing one embodiment of a method 250 for updating an ingest rate estimate. Although the method 250 is described in conjunction with the network media system 100 of FIG. 1 and components thereof, other embodiments of the method 250 may be implemented with other network media systems and/or other components thereof.

As illustrated, at block 252, the protocol engine 122 calculates an ingest rate estimate 134. In some embodiments, at block 254, the protocol engine 122 sends the ingest rate estimate 134 to the local host 106. The protocol engine 122 may recalculate a current ingest rate estimate 134 at some point. In some embodiments, the last ingest rate estimate 134 sent to the local host 106 is defined as the previous ingest rate estimate and the last ingest rate estimate 134 that the protocol engine 122 calculates is defined as the current ingest rate estimate. Hence, at block 256, the protocol engine 122 determines whether the difference between the previous ingest rate estimate and the current ingest rate estimate exceeds the predetermined rate threshold 125. If the difference between the previous ingest rate estimate and the current ingest rate estimate does not exceed the predetermined rate threshold 125, at block 258, the protocol engine 122 does not send the current ingest rate estimate to the local host, because the difference between the previous ingest rate estimate and the current ingest rate estimate is minimal enough that the status of the ingest stream based on the previous ingest rate estimate 134 and displayed on the display device 110 of the local host 106 remains accurate within a margin of error as defined by the predetermined rate threshold 125. Hence, at block 258, the previous ingest rate estimate 134 sent to the local host 106 is maintained as the current rate of ingest of the ingest stream by the network media server 104. As described above, the protocol engine 122 recalculates the ingest rate estimate 134, and, at block 256, the protocol engine 122 again determines whether the difference between the previous ingest rate estimate and the current ingest rate estimate, or the ingest rate estimate 134 recalculated by the protocol engine 122, exceeds the predetermined rate threshold 125.

If the difference between the previous ingest rate estimate and the current ingest rate estimate does exceed the predetermined rate threshold 125, at block 262, the protocol engine 122 sends a new ingest rate estimate to the local host 106. Hence, at block 262, the protocol engine 122 updates the ingest rate estimate 134 at the local host 106. The protocol engine 122 then recalculates the current ingest rate estimate and, at block 256, the protocol engine 122 again determines whether the difference between the previous ingest rate estimate 134 and the current ingest rate estimate exceeds the predetermined rate threshold 125.

Figure 6:
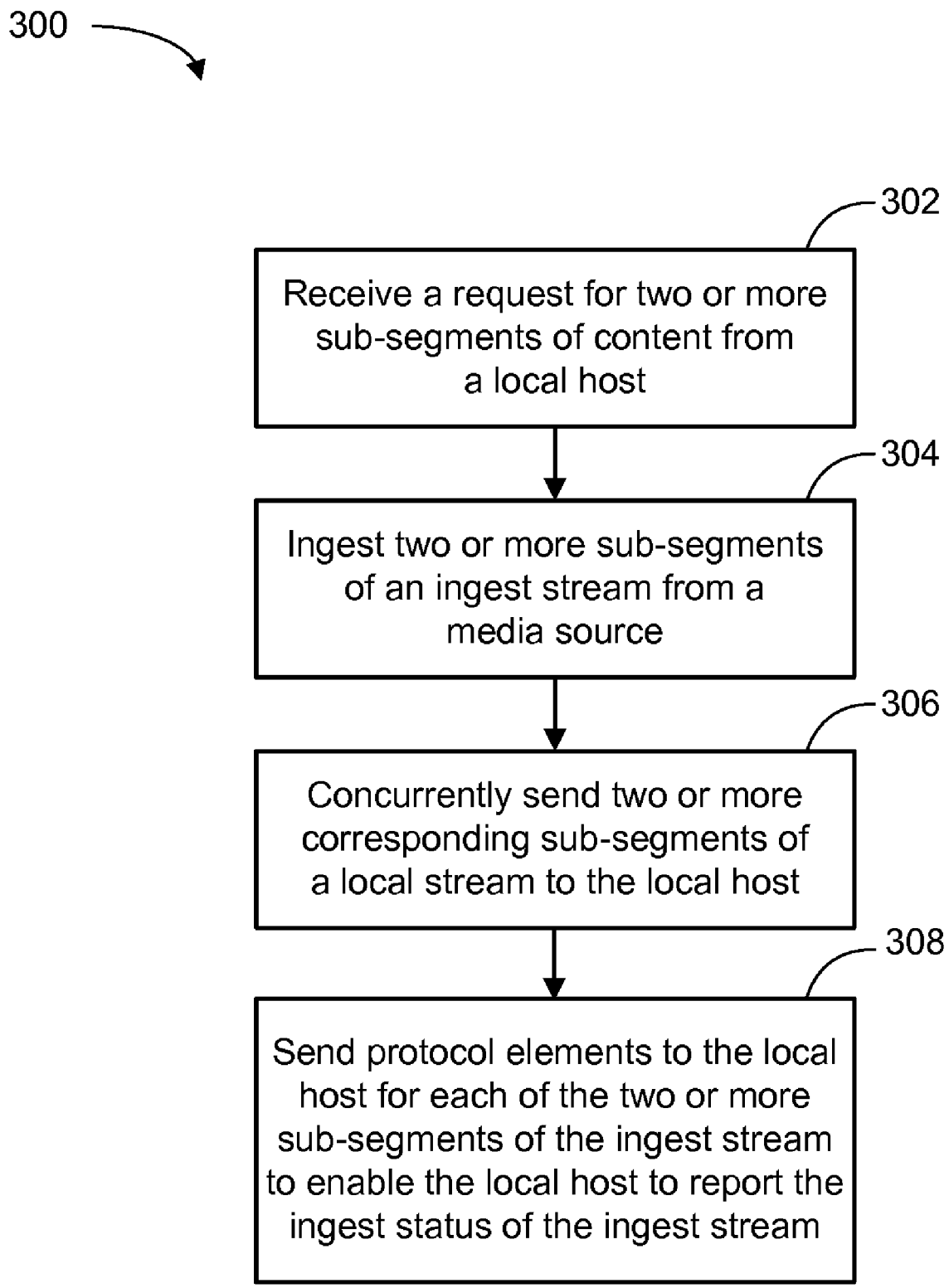
FIG. 6 depicts a flow chart diagram showing one embodiment of a method for reporting the ingest status of two or more sub-segments of an ingest stream at the local host of FIG. 1.

FIG. 6 depicts a flow chart diagram showing one embodiment of a method 300 for reporting the ingest status of two or more sub-segments of an ingest stream at the local host of FIG. 1. Although the method 300 is described in conjunction with the network media system 100 of FIG. 1 and components thereof, other embodiments of the method 300 may be implemented with other network media systems and/or other components thereof.

As illustrated, at block 302, the media source 102 receives a request for two or more sub-segments of content from the local host 106. At block 304, the network media server 104 ingests two or more sub-segments of an ingest stream from the media source 102. At block 306, the concurrent streamer 120 of the network media server 104 concurrently sends the two or more corresponding sub-segments in a local stream to the local host 106. At block 308, the protocol engine 122 sends a protocol element to the local host 106 for each of the two or more sub-segments of the ingest stream to enable the local host 106 to report the ingest status of the ingest stream of sub-segments.

Other embodiments of the methods 200, 250, and 300 may implement fewer or more operations. At least some of the operations for the method 200, 250, and 300, and the network media system 100 may be implemented using software instructions stored on a computer useable storage medium for execution by a computer. As an example, an embodiment of a computer program product includes logic encoded in one or more tangible media for execution and when executed, causes the computer to perform operations, as described above.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), and high-definition (HD) disks such as Blu-Ray and HD-DVD.

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An apparatus comprising:
   a network media server comprising:
   a memory device;
   a processor;
   a content receiver to receive an ingest stream of media content from a media source in response to a request for the media content from a local host;

a concurrent streamer coupled to the content receiver, the concurrent streamer to send at least a portion of a local stream of the media content to the local host concurrent with the reception of the ingest stream of the media content by the content receiver;

a protocol engine coupled to the concurrent streamer, the protocol engine to send a protocol element from the network media server to the local host, wherein the protocol element indicates an ingest status of the ingest stream at the content receiver; and wherein the media content comprises at least two sub-segments of media content from the media source, the ingest stream comprises at least two sub-segment ingest streams, and the local stream comprises at least two sub-segment local streams, wherein the protocol element comprises sub-segment protocol elements for each of the at least two sub-segment ingest streams, wherein the sub-segment protocol elements identify a sub-structure of the at least two sub-segments of media content and indicate an ingest status of each of the at least two sub-segment ingest streams.

2. The apparatus of claim 1, wherein the protocol element comprises a content duration to indicate a total time duration of the media content, wherein the protocol engine is further configured to send the content duration from the network media server to the local host.

3. The apparatus of claim 2, wherein the protocol element comprises a content ingest duration to indicate a time duration of the ingest stream of the media content by the network media server, wherein the protocol engine is further configured to send the content ingest duration to the local host in conjunction with the content duration to enable the local host to display the content ingest duration relative to the content duration.

4. The apparatus of claim 1, wherein the protocol engine is further configured to allow a user to implement a trick mode on at least the portion of the local stream of the media content up to the content ingest duration of the ingest stream, wherein the trick mode comprises a fast forward of the local stream up to the content ingest duration of the ingest stream, to transition from the trick mode to a 1× rate in response to reaching the content ingest duration of the ingest stream in the trick mode, and to notify the local host of the transition from the trick mode to the 1× rate.

5. The apparatus of claim 1, wherein the protocol element comprises an ingest rate estimate to indicate an average ingest rate of the ingest stream, wherein the protocol engine is further configured to periodically determine the average ingest rate of the ingest stream of the media content and to send the ingest rate estimate to the local host to enable the local host to estimate a current stream rate of the local stream based on the average ingest rate of the ingest stream.

6. The apparatus of claim 5, wherein the protocol engine is further configured to determine whether a difference between the average ingest rate and a previous average ingest rate exceeds a predetermined threshold, wherein the protocol engine is further configured to send the ingest rate estimate to the local host in response to the determination that the difference exceeds the predetermined threshold.

7. The apparatus of claim 1, wherein the protocol engine is further configured to send the protocol element with the local stream.

8. The apparatus of claim 7, wherein the protocol engine is further configured to embed the protocol element in the local stream and to send the local stream to the local host via a real-time transport protocol (RTP).

9. The apparatus of claim 1, wherein the protocol engine is further configured to send the protocol element from the network media server to the local host via a message separate from the local stream, wherein the protocol element is transported within a streaming control protocol.

10. A method comprising:

receiving and storing at least a portion of a local stream of media content at a set-top box at a local host device concurrent with a reception of an ingest stream of the media content by a network media server in response to a request for the media content from the local host device, the local host device being separate from the network media server; and receiving an ingest status at the local host device from the network media server, wherein the ingest status indicates an ingest progress of the ingest stream at the network media server;

wherein the media content comprises at least two sub-segments of media content from the media source, the ingest stream comprises at least two sub-segment ingest streams, and the local stream comprises at least two sub-segment local streams, wherein the protocol element comprises sub-segment protocol elements for each of the at least two sub-segment ingest streams, wherein the sub-segment protocol elements identify a sub-structure of the at least two sub-segments of media content and indicate an ingest status of each of the at least two sub-segment ingest streams.

11. The method of claim 10, further comprising:

receiving a first field of the ingest status at the local host device from the network media server, wherein the first field of the ingest status indicates a total time duration of the media content;

receiving a second field of the ingest status at the local host device from the network media server, wherein the second field of the ingest status indicates a content ingest duration of the media content.

12. The method of claim 10, further comprising:

receiving a field of the ingest status at the local host device from the network media server, wherein the field of the ingest status indicates a percentage of completion of the current ingestion of the ingest stream by the network media server;

calculating a percentage of completion of the local stream based on the percentage of completion of the current ingestion of the ingest stream at the network media server; and controlling playback of the local stream at the local host device based on the ingest status of the ingest stream at the network media server.

13. The method of claim 10, further comprising:

receiving a current average ingest rate at the local host device from the network media server, wherein the current average ingest rate indicates an average ingest rate of the ingest stream of the media content at the network media server;

estimating a current stream rate of the local stream based on the current average ingest rate of the ingest stream;

receiving a subsequent current average ingest rate at the local host device from the network media server in response to a determination that a difference between the subsequent current average ingest rate and the current average ingest rate exceeds a predetermined threshold; and estimating a subsequent current stream rate of the local stream based on the subsequent current average ingest rate of the ingest stream.

14. The method of claim 10, further comprising receiving the ingest status with the local stream at the local host device.

15. The method of claim 10, further comprising receiving the ingest status at the local host device from the network media server via a message separate from the local stream, wherein the ingest status is transported within a streaming control protocol.

16. An apparatus comprising:
a network media server comprising:
- a memory device;
- a processor;
- a content receiver to receive at least two sub-segment ingest streams of media content, from a media source in response to a request for at least two sub-segments of the media content from a local host, the local host being separate from the network media server;
- a concurrent streamer coupled to the content receiver, the concurrent streamer to send at least a portion of the at least two sub-segments of the media content to be stored at a set-top box at the local host concurrent with the reception of the at least two sub-segment ingest streams of the media content by the content receiver; and
- a protocol engine coupled to the concurrent streamer, the protocol engine to send a protocol element for each of the at least two sub-segments from the network media server to the local host, wherein the protocol element comprises sub-segment protocol elements for each of the at least two sub-segment ingest streams, wherein the sub-segment protocol elements identify a sub-structure of the at least two sub-segments of media content and indicates an ingest status of the ingest stream at the content receiver.

17. The apparatus of claim 16, wherein the protocol element further comprises:
- a content duration to indicate a total time duration of the media content, wherein the protocol engine is further configured to send the content duration from the network media server to the local host; and
- a content ingest duration to indicate a time duration of the ingest stream of the media content by the network media server, wherein the protocol engine is further configured to send the content ingest duration to the local host in conjunction with the content duration to enable the local host to display the content ingest duration relative to the content duration.

18. The apparatus of claim 16, wherein the protocol engine is further configured to allow a user to implement a trick mode on at least the portion of the local stream of the media content up to the content ingest duration of the ingest stream, wherein the trick mode comprises a fast forward of the local stream up to the content ingest duration of the ingest stream, to transition from the trick mode to a 1× rate in response to reaching the content ingest duration of the ingest stream in the trick mode, and to notify the local host of the transition from the trick mode to the 1× rate.

19. The apparatus of claim 16, wherein the protocol element comprises an ingest rate estimate to indicate an average ingest rate of the ingest stream, wherein the protocol engine is further configured to:
- periodically determine the average ingest rate of the ingest stream of the media content and to send the ingest rate estimate to the local host to enable the local host to estimate a current stream rate of the local stream based on the average ingest rate of the ingest stream; and
- determine whether a difference between the average ingest rate and a previous average ingest rate exceeds a predetermined threshold, wherein the protocol engine is further configured to send the ingest rate estimate to the local host in response to the determination that the difference exceeds the predetermined threshold.

20. The apparatus of claim 16, wherein the protocol engine is further configured to:
- send the protocol element with the local stream, wherein the protocol engine embeds the protocol element in the local stream and sends the local stream to the local host via a real-time transport protocol (RTP); or
- send the protocol element from the network media server to the local host via a message separate from the local stream, wherein the protocol element is transported within a streaming control protocol.

* * * * *